Figure 1:
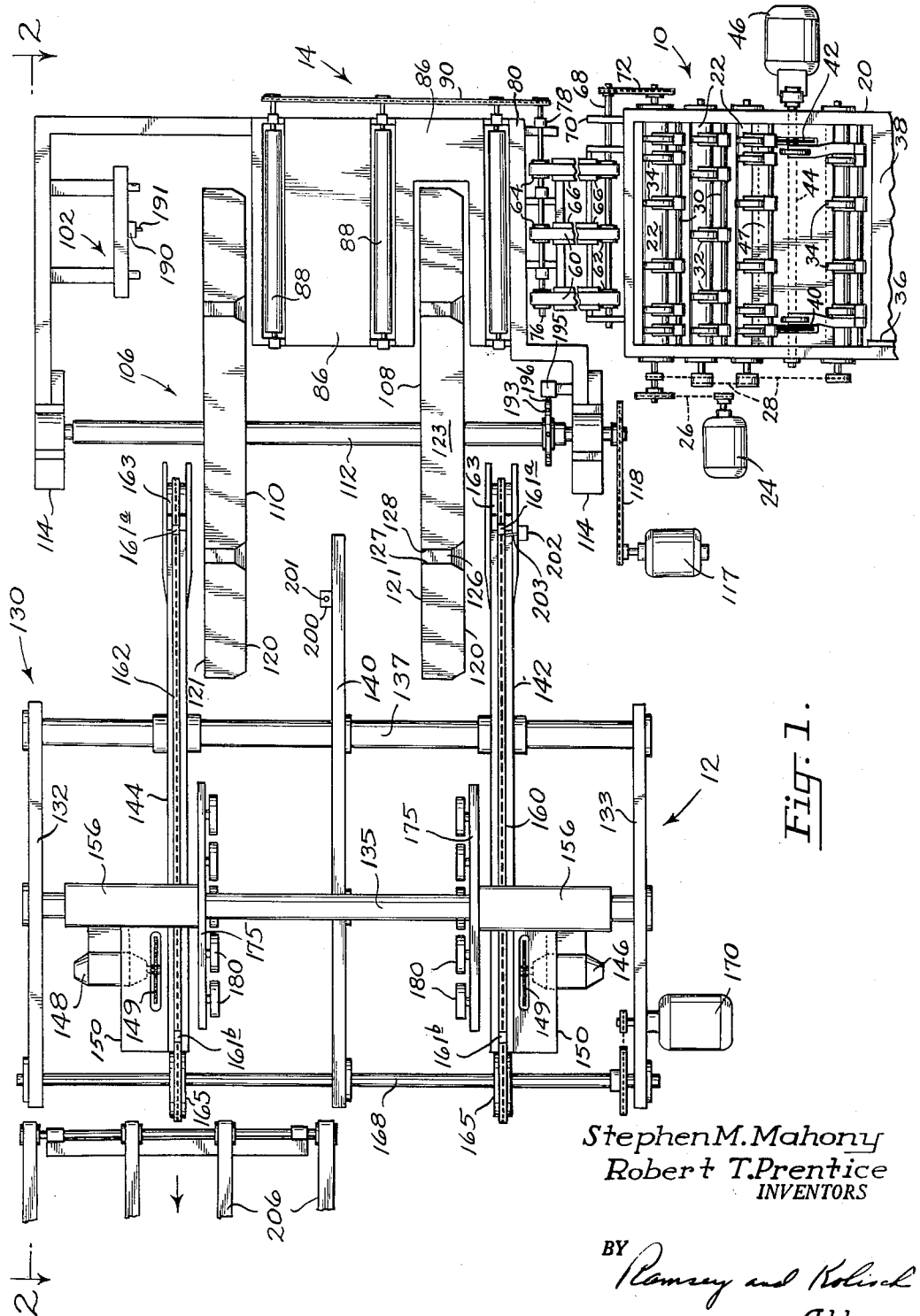

Stephen M. Mahony
Robert T. Prentice
INVENTORS

Stephen M. Mahony
Robert T. Prentice
INVENTORS

BY Ramsey and Kolisch
Attys.

3,063,480
TRANSFER MECHANISM FOR PANELS
Stephen M. Mahony and Robert T. Prentice, Portland, Oreg., assignors to Prentice Machine Works, Inc., Portland, Oreg., a corporation of Oregon
Filed Dec. 7, 1959, Ser. No. 857,809
10 Claims. (Cl. 143—48)

This invention relates to transfer mechanism for panels, and more particularly to transfer mechanism for use with apparatus such as trimmer saws that is operable to transport panels from the saws trimming off one set of edges of a panel to a following set of saws that trim off edges normal to said one set of edges, thus to make the panel truly rectangular.

The invention has particular utility in connection with the manufacture of plywood panels, since such panels normally are made oversize and are trimmed to standard size, such as a 4 x 8 foot dimension, after manufacture of the panel. While the invention is described hereinbelow in connection with the trimming of plywood panels, it should be understood that this is for illustrative purposes only, and the transfer mechanism may be used in other operations where problems encountered are similar.

In the trimming of plywood panels, a method commonly used is to send the panel through one set of saws which trim along opposite margins to produce parallel edges spaced predetermined distance apart. The panel is then sent through another set of saws where margins normal to the just-formed parallel edges are trimmed. While the operation described is conventional, apparatus constructed to perform the operation has taken a number of different forms.

In general terms it is an object of this invention to provide improved apparatus for transporting a panel between the two sets of saws operable to transport the panel directly from the first set of saws and deliver it to the second set with the uncut margins remaining after the first trimming in proper position for trimming by the second set of saws.

A feature of the construction is the provision of novel means whereby panels quickly are cleared from an off-bearing portion of the conveyor moving a panel past the first set of saws, freeing this off-bearing portion for the reception of a succeeding panel.

A further feature of the invention is the provision of novel mechanism whereby panels cleared from such off-bearing portion are delivered to the feed end of the conveyer for the second set of trimmer saws with the just-cut edges at right angles to the kerfs produced by the second set of saws.

In a preferred embodiment of the invention the conveyer for the first set of trimmer saws may take the form of conventional belts followed adjacent the discharge end thereof by a series of roller mechanisms set side by side and extending transversely of the path of travel defined by the conveyer. At the discharge end of the roller mechanisms is an abutment or stop, which stops forward progress of a panel along the conveyer with the panel resting on the roller mechanism. The latter may be rotating freely beneath the underface of the panel at this time.

Rotatably mounted to one side of the conveyer is a turner wheel assembly comprising a pair of opposed wheel structures which rotate about an axis substantially parallel to the path of the conveyer. These opposed wheel structures are spaced axially from each other, and their peripheries rotate in sweeps which pass between the rollers mentioned. The wheel structures are provided with mated slots defining plural pockets for the turner wheel assembly. These pockets are moved successively into registry with the path of the conveyer by rotary movement of the wheel assembly. With a pocket in a registering position, a panel may be fed into the pocket, and when the wheel assembly is then rotated, the panel is moved vertically from the support plane of the conveyer. This immediately clears the conveyer. Continued movement of the wheel structures places the panel on a second conveyer, which moves the panel into the second set of trimmer saws. Preferably the turner wheel assembly is operated intermittently and between periods of actuation the assembly rests with a pocket in registry with the path of the first-mentioned conveyer.

Thus another object of the invention is to provide transfer mechanism for panels which comprises a first conveyer means and a turner wheel assembly rotatably mounted adjacent the discharge end of the first conveyer means for movement about an axis extending parallel to the first conveyer means, said turner wheel assembly being provided with pockets moved into registry with the path of the first conveyer means operable to pick up panels periodically and shift them in a vertical direction from the support plane of the first conveyer means.

A further object is to provide such a construction wherein the turner wheel assembly is driven intermittently, and wherein the panels are deposited by the turner wheel assembly on runs of conveyer belts aligned substantially with the direction of movement of the turner wheel assembly.

Another object is to provide such a construction wherein a panel is positioned by the turner wheel assembly so that one of its edges is parallel to its rotation axis.

Another object is to provide a construction wherein the turner wheel assembly comprises a pair of opposed and axially spaced wheel structures, the latter rotating between sets of transversely arranged roller mechanisms, such roller mechanisms supporting a panel prior to its pickup by the turner wheel assembly.

A still further object of the invention is to provide a construction wherein the belts of the conveyer means receiving panels from the turner wheel assembly are provided with mated lugs aligned in a direction normal to the belts, and wherein means is provided intermittently for moving the belts so that when a panel is deposited thereon by the turner wheel assembly, the mated lugs move forwardly to remove a panel with its trailing edge normal to the belts.

Figure 2:
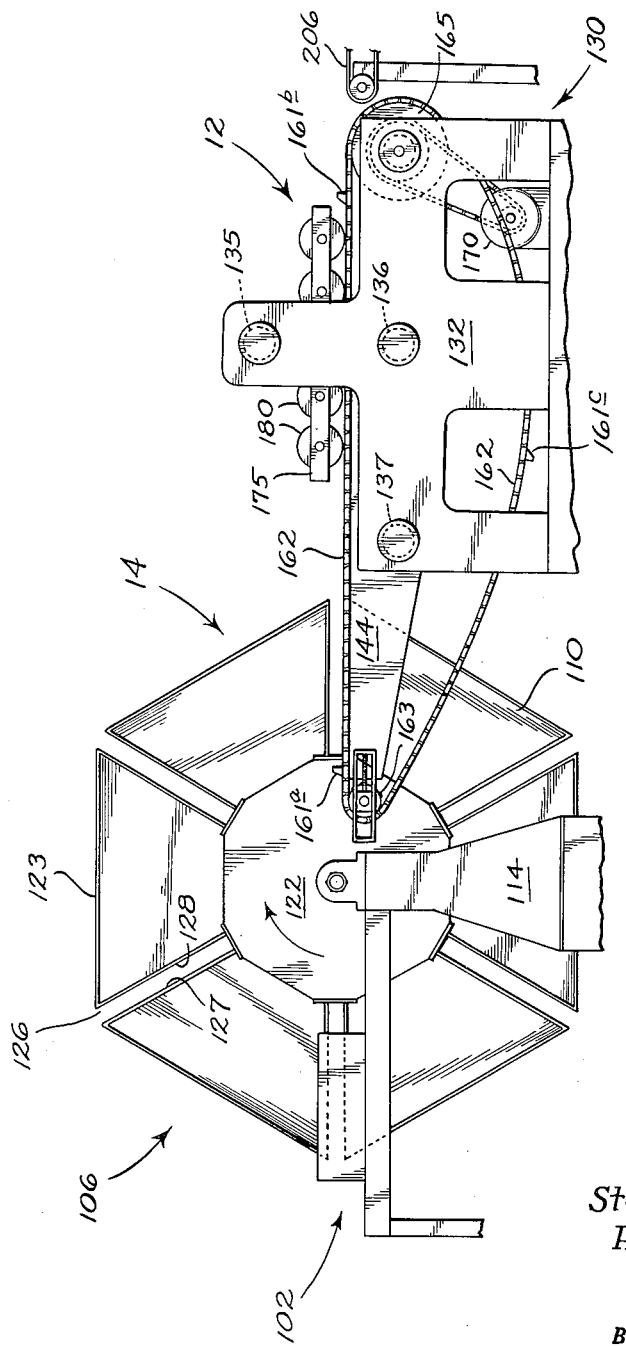

Other objects and advantages will become apparent as the following description is read in conjunction with the accompanying drawings, wherein:

FIG. 1 is a plan view of an embodiment of the apparatus contemplated, illustrating two sets of paired trimmer saws positioned with the saws of one set at right angles with respect to the saws of the other set, and including transfer mechanism between the two sets of saws for transporting panels between the two; and FIG. 2 is a side elevation of portions of the construction shown in FIG. 1 along the line 2—2 in FIG. 1, and illustrating the turner wheel assembly of the construction.

Referring now to the drawings, 10 indicates generally a first trimmer saw assembly adjacent the infeed end of the apparatus, constructed to trim the long margins of a rectangular panel, such as a plywood panel, to produce parallel straight edges along these margins. The assembly may be referred to as a "skinner" saw assembly. Forwardly of the skinner saw assembly and arranged with the saws thereof disposed substantially at right angles to the saws of the skinner saw assembly is a second trimmer saw assembly indicated at 12. Saw assembly 12 is operable to trim the margins of a panel that extend normally to the margins trimmed by assembly 10. Trimmer saw assemblies 10 and 12 are provided with transfer conveyor mechanism, indicated in the drawings generally at 14, which transports panels through the assemblies. In transporting panels between the two trimmer saw assemblies, mechanism 14 changes the direction of travel so that panels, while traveling longitudinally through assembly 10, travel transversely through assembly 12.

More specifically, skinner saw assembly 10 comprises frame structure 20 suitably supported above the floor. Rotatably mounted in frame structure 20 and disposed in substantially a horizontal plane are a series of smooth-surfaced steel rollers indicated at 22. The upper surfaces of the rollers define a support plane for panels as they travel through the skinner saw. The rollers are rotated in a direction causing panels to move upwardly from the bottom of the page in FIG. 1, by means of a motor 24, a drive chain 26 trained over a sprocket secured to a shaft extension of the upper of the rollers 22 in FIG. 1, and chains 28 interconnecting the other rollers 22 with the upper roller 22.

Supported above rollers 22 by means of frame members 30 of frame structure 20 and wheel mounts 32, are a series of semi-pneumatic tires or wheels 34. These wheels rotate freely in mounts 32, and function to press a panel firmly downwardly on rollers 22 when the same is fed through the skinner saw assembly. Along one side of the assembly is a fence, partially shown in the drawings and indicated at 36. The fence aligns one margin of a panel prior to sending it through the skinner saw assembly, with the panel resting on feed table 38.

Skinner saw assembly 10 includes a pair of circular saws indicated at 40, 42, disposed adjacent either side of the path of travel of a panel through the assembly. The saws are parallel and produce cuts along opposite margins of a panel that parallel its direction of travel. The saws are secured to a power-driven saw arbor 44, journaled in frame structure 20 below the support plane of rollers 22, and driven by a motor 46. At 47 is indicated a table supporting a panel as it is cut by saws 40, 42.

From this description it will be seen that a panel (or a stack of plural panels if the panels are relatively thin) may be moved through the apparatus under the urging of power-driven rollers 22, with the panel traveling upwardly in FIG. 1. The panel travels lengthwise past the saws, and the saws 40, 42 trim off opposed longitudinal edges of the panel to produce a panel with parallel longitudinal edges spaced a predetermined distance apart. On leaving the trimmer saw assembly, trimmings fall off the apparatus, and the panel is transported further by means to be described to prepare it for the trimming of its transverse edges.

Considering now in more detail transfer conveyor mechanism 14, directly on the off-bearing side of skinner saw assembly 10 are plural conveyer belts 60. These extend side by side, and have ends trained over sets of pulleys 62, 64. The top runs of the belts intermediate pulleys 62, 64 are supported on ways 66.

The rear set of pulleys 62 is secured to a shaft 68 journaled in brackets 70 that are part of frame structure 20. Belts 60 are driven by means of a chain 72 connecting a shaft extension of the upper of the rollers 22 in FIG. 1 with shaft 68. The gear ratio of the sprockets training the ends of chain 72 is such that belts 60 are driven at a substantially greater speed than rollers 22, normally at about twice the speed. The forward set of pulleys 64 is secured to a shaft 76 journaled in brackets 78, the latter being part of another framework 80.

In front of or toward the discharge end of belts 60 and supported on framework 80 is a table 86 disposed slightly below the support plane defined by belts 60. Laterally spaced from each other and at intervals along the table and journaled in framework 80 are plural, smooth-surfaced steel rollers 88. The upper surfaces of these rollers protrude through cutouts provided the table and are disposed slightly above the level of the top of table 86. Rollers 88, belts 60 and rollers 22 together constitute a first conveyor means in the apparatus defining a path of travel for panels. Rollers 88 are set transversely to this path of travel.

Rollers 88 making up the last section of the first conveyor means are driven by a chain 90 which is driven by shaft 76. The rollers have a running speed substantially the same as the running speed of the belts. The rollers, since they are smooth-surfaced, can rotate freely beneath a panel held in a stationary position thereover, without causing damage to such panel.

In front of or at the discharge end of rollers 88, and mounted on framework 80, is an abutment or stop means 102. This is positioned above the support plane of rollers 88, and in operation is operable to engage the leading edge of a panel traveling along the first conveyor means and prevent further forward movement of the panel to ready it for transport toward saw assembly 12.

Continuing with a description of transfer conveyor mechanism 14, mounted to one side of the rollers 88 is a turner wheel assembly or continuous carrier mechanism, indicated generally at 106. This assembly constitutes means in the apparatus for removing a panel traveling over the first conveyor means and shifting it laterally and to one side of the path of travel of panels over the first conveyor means.

The turner wheel assembly in the embodiment illustrated comprises a pair of wheel structures 108, 110, which are similar in construction, secured to a shaft 112. Shaft 112 is journaled above the floor on standards 114 of framework 80 for rotation about an axis parallel to the path of panels over the first conveyor means. Wheel structures 108, 110 have polygonal outlines, as best seen in FIG. 2, and the peripheries or edges of the wheel structures sweep through the support plane defined by rollers 88. The turner wheel assembly is rotated by power-actuated means or motor 117 drivingly connected to shaft 112 by chain 118.

Considering the construction of each wheel structure 108, 110, each may be made of metal plate including surfacing plates 120, 121 over opposite faces braced by internal frame structure (not shown) and secured to a hub 122. Plate portions 123 close off the peripheral edge of a wheel structure between plates 120, 121. Each wheel structure is provided with plural slots 126 extending radially inwardly from the edge thereof and defined by plates 127, 128. The slots of one wheel structure mate with the slots of the other, and a mated pair of slots together define a pocket means or station that is first moved into and then out of registry with the path of travel of a panel over rollers 88, by rotation of the turner wheel assembly. The slots preferably flare open toward the side that faces saw assembly 10, as shown in FIG. 1, since this promotes funneling of a panel or stack of panels into the slots when such panel or panels move over rollers 88. A panel or stack of panels occupying a mated pair of slots is prevented, by the narrow width of the slots, from skewing and twisting when such pair of slots moves up and over the rotation axis of the turner wheel assembly.

Considering now the second of the trimmer saw assemblies 12, this comprises a framework 130 made up of opposed upright standards 132, 133 on either side thereof. Standards 132, 133 are interconnected and made rigid by means of strengthener tubes 135, 136, 137 that extend between the standards. The lower two tubes 135, 136 are also supported by a center standard 140, the top of which partially supports panels as they are transported along the trimmer saw assembly.

Mounted on tubes 136, 137 on either side of the saw assembly, are a pair of chain ways 142, 144. Tubes 135, 136 mount a pair of hanger brackets 156, and these hanger brackets in turn mount a pair of saw motors 146, 148 driving a pair of circular trimmer saws 149, and a pair of table sections 150.

Supported on the chain ways with their upper runs sliding thereover are a pair of continuous conveyor belts in the form of chain belts indicated at 160, 162. Each is provided with three sets of lugs 161a, 161b, 161c, and each lug of one chain has a corresponding lug in the other chain that is in alignment with the lug, in a direction extending normally of the belt runs. Chains 160, 162 have their rear ends trained over sprockets 163 and their forward ends trained over sprockets 165. The rear set of sprockets 163 is journaled in brackets that are part of the chain ways 142, 144. The forward set of sprockets 165 is secured to a shaft 168 journaled in standards 132, 133 and driven by a motor 170.

Motor 170 is operable to move the lug chains so that the lugs of the chains travel from right to left in FIG. 1 when they form part of the upper runs of the chains. The upper runs of the chains support a panel or stack of panels when such is moved over table sections 150 and into the teeth of saws 149. Saws 149 produce kerfs in such panels that extend normally to the trimmed edges produced by the saws of the saw assembly 10, due to the alignment of the mated lugs of the chains.

Supported on hanger brackets 156 above the upper runs of the lug chains are frames 175 each mounting freely rotatable semi-pneumatic tires or wheels 180. These function as hold-down wheels, and press a panel or stack of panels downwardly on the upper runs of the chains and on table sections 150 during cutting of the panel or panels by saws 149.

Sprockets 163, training rear portions of the lug chains, are located radially inwardly on the turner wheel assembly from the inner ends of slots 126, with the slots occupying a position aligned substantially with the upper runs of the lug chains. Preferably motor 170 is operated to move lug chains 160, 162 intermittently. The chains are stopped after a period of movement so that a pair of mated lugs occupies positions disposed directly behind the inner ends of a pair of mated slots and a panel deposited therein. Thus when motor 170 is subsequently started, the mated lugs move forwardly to engage the trailing edge of a panel and move it out of the turner wheel assembly and squarely into saws 149. Chains 160, 162 constitute a second conveyor means in the apparatus aligned with the turner wheel and defining a path that extends normally of the path defined by belts 60 and rollers 88.

Another transfer mechanism may be provided in front of trimmer saw assembly 12 for moving panels away from the assembly after trimming of its edges. Thus in the embodiment shown power-driven belts 206 are provided that form a continuation of the conveyer means defined by lug chains 160, 162, and these carry panels forwardly from the trimmer saw assembly.

Considering now the control for the various motors, 190 indicates a control switch used in starting motor 117 and movement of the turner wheel assembly. This has a switch finger 191 actuated to start operation of the motor when a panel moves over rollers 88 against abutment or stop 102. Rotating with shaft 112 is a cam 193 having plural nodes corresponding in number to the number of slots provided in wheel structure 108, 110. A switch 195 having a switch finger 196 is actuated by a node of cam 193 to stop operation of motor 117 when a mating pair of slots of the turner wheel assembly moves into a position aligned or in registry with the support plane defined by chains 160, 162.

Switches regulating the operation of motor 170 driving lug chains 160, 162 are indicated at 200 and 202. Switch 200 is for starting motor 170 and has a switch finger 201 projecting into the support plane defined by chains 160, 162. When a panel is moved by the turner wheel assembly down on the finger 201, switch 200 is actuated to start motor 170 and the lug chains start to move. Switch 202 has a finger 203 contacted by a lug of a chain when such lug moves to a position directly to the rear of a panel ready for pickup. Contact of finger 203 actuates switch 202 to stop operation of motor 170.

Explaining the operation of the apparatus, a panel (or a stack of panels if the panels are relatively thin) is placed on feed table 38 for skinner saw assembly 10. This is moved into fence 36 to align one edge. The panel, when shoved forwardly, is grabbed by wheels 34 and smooth-surfaced rollers 22. When this occurs the panel advances through the assembly 10, with opposite edges trimmed by saws 40, 42.

On clearing the first of the trimmer saw assemblies, the panel is transported forwardly by belts 60 at a substantially faster speed than its speed over rollers 22, so that the trailing edge of the panel will be spaced from the leading edge of a following panel. The panel progresses forwardly until it strikes abutment 102. The turner wheel assembly has already been positioned to place a set of mated slots in registry with the path of travel defined by rollers 88, and the panel thus travels through the slots. Switch 190 is then actuated resulting in rotation of the turner wheel assembly with movment of the panel upwardly and off the plane of rollers 88. Movement continues until the next succeding mated slots in the wheel assembly move into registry with the plane of rollers 88, at which time wheel assembly 106 stops. As soon as these next succeeding slots reach a registering position, rollers 88 of first conveyer means are free to receive a succeeding panel.

When a panel is moved by the turner wheel assembly onto lug chains 160, 162, motor 170 is started to cause movement of the lug chains, with the panel moving radially out of the turner wheel assembly and thence into the second set of trimmer saws. The lug chains continue their movement until stopped through switch 202. After the panel moves through the trimmer saws of assembly 12, all edges of the panel are trimmed and the panel is truly rectangular.

It will be noted that the direction of travel of a panel is changed, so that the panel at first travels in a direction parallel to one dimension, and then travels in a direction at right angles to this direction. It should further be noted that the turner wheel assembly is operable not only to clear immediately the last section of the first conveyer means, but also to hold a panel tightly enough to prevent it from falling over and skewing or twisting as the wheel assembly rotates. Also important is the fact that as the turner wheel assembly rotates, a panel carried in the assembly is carried to a vertical, on-edge position, and one of its trimmed edges is made parallel to the rotation axis of the assembly by the inner ends of the mated slots carrying the panel. This positions the panel for pickup by the lug chains.

While an embodiment of the invention has been described, it is appreciated that variations and modifications are possible without departing from the invention. It is intended not to be limited to the specific embodiment illustrated, but to cover all modifications and variations that would be apparent to one skilled in the art and that come within the scope of the appended claims.

It is claimed and desired to secure by Letters Patent:

1. In trimmer saw mechanism for trimming off opposite sets of edges of a substantially rectangular panel having the combination of a first conveyer means defining a substantially horizontal path of travel for a panel and a pair of power-driven saw mechanisms positioned on either side of such path for trimming one set of edges of the panel, and a second conveyer means adjacent the discharge end of the first conveyer means defining a substantially horizontal path of travel for a panel that extends substantially normally of the first-mentioned path defined by said first conveyer means and a pair of power-driven saw mechanisms positioned on either side of the path defined by said second conveyer means for trimming the other set of edges of the panel; means for removing a panel traveling on said first conveyer means and depositing it on said second conveyer means, said means comprising a turner wheel assembly rotatable about an axis disposed on one side of the path defined by said first conveyer means and substantially aligned in a direction extending transversely of its rotation axis with the second conveyer means, said turner wheel assembly having plural pockets radially indented into its periphery, each constructed to hold a panel, that are moved successively into the path of travel defined by the first conveyer means on rotation of the wheel assembly thus to be placed in receiving relationship relative to the first conveyer means, each of said pockets on continued rotation of the turner wheel assembly moving into the path defined by the second conveyer means thus to be placed in discharging relationship relative to said second conveyer means.

2. The apparatus of claim 1 which further comprises power-operated means for rotating the turner wheel assembly and means actuated by a panel traveling over the first conveyer means for operating intermittently said power-operated means.

3. In trimmer saw mechanism having an elongated first conveyer means for transporting substantially rectangular panels in a direction parallel to one set of their edges and defining a path of travel for the panels, stop means adjacent the discharge end of the conveyer means for limiting forward movment of panels, a pair of power-driven saw mechanisms positioned on either side of the first conveyer means and disposed toward the infeed end of said conveyer means from said stop means, and a second conveyer means adjacent said stop means extending substantially normally of and to one side of said first conveyer means for transporting panels in a direction substantially parallel to their other set of edges and defining another path of travel for the panels; means for removing panels traveling on said first conveyer means and depositing them on said second conveyer means, said means comprising a turner wheel assembly positioned partly to one side of the path of travel defined by the first conveyer means and rotatable about an axis parallel to such path of travel and aligned in a direction extending transversely of its rotation axis with said second conveyer means, said turner wheel assembly having plural pockets, each constructed to hold a panel, radially indented into the periphery of the turner wheel assembly and movable on its rotation successively into the path of travel defined by the first conveyer means thus to be placed in receiving relationship relative to the first conveyer means, each of said pockets on continued rotation moving into the path of travel of the second conveyer means to be placed in discharging relationship relative to the second conveyer means, and intermittently operated power-actuated means for rotating the turner wheel assembly, the latter being regulated by control means actuated upon a panel engaging said stop means.

4. Transfer mechanism for lumber comprising a first conveyer means for transporting lumber in a path, a turner wheel assembly mounted partly to one side of the first conveyer means adjacent its discharge end for rotation about an axis substantially parallel to the path for lumber defined by the first conveyer means, said turner wheel assembly having plural pockets radially indented into the periphery thereof for receiving lumber and placed successively in registry with the path of travel defined by the first conveyer means on rotation of the wheel assembly, and a second conveyer means substantially aligned with the turner wheel assembly and extending in a direction normal to the rotation axis of the turner wheel assembly, the latter conveyer means being positioned to pick up lumber from the pockets of the turner wheel after the pockets have advanced from positions in registry with the first conveyer means to positions in registry with the second conveyer means.

5. The transfer mechanism of claim 4, wherein said second conveyer means comprises a pair of lug chains mounted with their upper runs defining a path of travel for lumber, said lug chains being provided with mated lugs aligned transversely of the chain runs operable to engage a piece of lumber carried in an aligned pocket of the turner wheel assembly and carry it out of the pocket with the trailing edge of the lumber aligned transversely of the chain runs.

6. Transfer mechanism for lumber comprising a first conveyer means defining a path for the travel of lumber and including a section adjacent its discharge end made up of roller mechanisms set side by side and extending transversely of said path, a turner wheel assembly mounted partly to one side of the first conveyer means adjacent its discharge end for rotation about an axis substantially parallel to said path, said turner wheel assembly comprising a pair of opposed wheel structures spaced axially from each other and mounted with edge portions thereof turning in spaces disposed between said roller mechanisms of the first conveyer means, said wheel structures having plural mated radially extending slots indented into their peripheries constituting plural pocket means for the wheel assembly and moved successively into registry with the path of the first conveyer means on rotation of the wheel structures, and a second conveyer means substantially aligned with the turner wheel assembly and extending in a direction normal to the rotation axis of the turner wheel assembly, the latter conveyer means being positioned to pick up lumber from a pocket means of the turner wheel assembly after the same has been moved from a position in registry with the path of the first conveyer means to a position in registry with the second conveyer means.

7. Transfer mechanism for lumber comprising a first conveyer means defining a path for the travel of lumber and including a section adjacent its discharge end made up of roller mechanisms set side by side and extending transversely of said path, a turner wheel assembly mounted partly to one side of the first conveyer means adjacent its discharge end for rotation about an axis substantially parallel to said path, said turner wheel assembly comprising a pair of opposed wheel structures spaced axially from each other and mounted with edge portions thereof turning in spaces disposed between said roller mechanisms of the first conveyer means, said wheel structures having plural mated radially extending slots indented into their peripheries constituting plural pocket means for the wheel assembly and moved successively into registry with the path of the first conveyer means on rotation of the wheel structures, and a second conveyer means substantially aligned with the turner wheel assembly and extending in a direction normal to the rotation axis of the turner wheel assembly, the latter conveyer means being positioned to pick up lumber from a pocket means of the turner wheel assembly after the same has been moved from a position in registry with the path of the first conveyer means to a position in registry with the second conveyer means, said second conveyer means comprising a pair of lug chains mounted with their upper runs defining a path of travel for lumber over the conveyer means and having mated lugs aligned transversely of the chain runs operable to engage the trailing edge of a piece of lumber carried in a pocket means and carry it out of the pocket means with the trailing edge of the lumber aligned transversely of the chain runs.

8. The apparatus of claim 7 which further comprises power-actuated means for turning the turner wheel assembly, and control means for said power-actuated means regulated by the movement of a piece of lumber over said first conveyer means, said control means actuating said power-actuated means intermittently and starting rotation of the turner wheel assembly when a piece of lumber occupies a pocket means positioned in registry with the path defined by said first conveyer means.

9. Trimmer saw mechanism comprising a first conveyer means defining a substantially horizontal path of travel for lumber, a pair of power-driven saw mechanisms positioned on either side of such path of travel operable to trim opposite side edges from lumber traveling over said first conveyer means, said first conveyer means including adjacent the discharge end thereof a section made up of rollers set side by side and extending transversely of said path of travel, a turner wheel assembly mounted partly to one side of the first conveyer means adjacent its discharge end for rotation about an axis substantially parallel to said path, said wheel assembly comprising a pair of opposed wheel structures spaced axially from each other and mounted with edge portions thereof turning in spaces disposed between rollers of the first conveyer means, said wheel structures having plural mated radially extending slots indented into their peripheries constituting plural pocket means for the wheel assembly and moved successively into registry with the path of the first conveyer means on rotation of the wheel structures, a second conveyer means substantially aligned with the turner wheel assembly and extending in a direction normal to the rotation axis of the turner wheel assembly, the latter conveyer means being positioned to pick up lumber from a pocket means of the turner wheel assembly after the same has been moved from a position in registry with the path of the first conveyer means to a position in registry with the second conveyer means, and a pair of opposed saw mechanisms disposed on either side of said second conveyer means operable to trim opposite edges of lumber traveling over said second conveyer means.

10. The mechanism of claim 9 which further comprises power-actuated means for turning said turner wheel assembly, and control means regulating said power-actuated means operable to start movement of the turner wheel assembly after lumber moves into a pocket means positioned in registry with the path defined by said first conveyer means.

References Cited in the file of this patent
UNITED STATES PATENTS

| | | |
|---|---|---|
| 160,783 | Millet | Mar. 16, 1873 |
| 384,786 | Rehfuss | June 19, 1888 |
| 614,089 | Coleman | Nov. 15, 1898 |
| 771,089 | Prescott | Sept. 27, 1904 |
| 912,764 | Wintgens | Feb. 16, 1909 |
| 1,123,056 | Wooster | Dec. 29, 1914 |
| 1,315,072 | Baker | Sept. 2, 1919 |
| 1,322,528 | Brokaw et al. | Nov. 25, 1919 |
| 2,506,087 | Kadell | May 2, 1950 |
| 2,559,378 | Stalder | July 3, 1951 |
| 2,565,779 | Muddiman | Aug. 28, 1951 |